Figure 1:
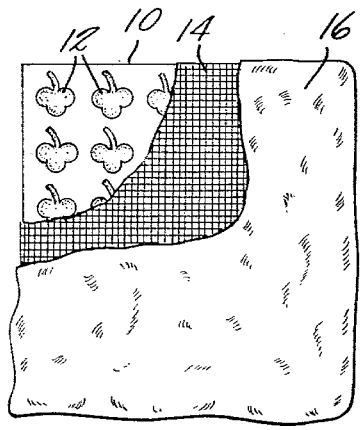

July 27, 1965      A. E. MURRAY      3,197,534

METHOD OF FORMING THIN RESILIENT SHELLS

Filed Aug. 22, 1961      3 Sheets-Sheet 1

INVENTOR.
ALAN E. MURRAY

BY

Eyre, Mann & Lucas
ATTORNEYS.

July 27, 1965 A. E. MURRAY 3,197,534
METHOD OF FORMING THIN RESILIENT SHELLS
Filed Aug. 22, 1961 3 Sheets-Sheet 2

CHEESECLOTH 14
GYPSUM PLASTER
SLURRY
16
PAPER TOWEL 24
HEAVY CARPET 22
LAYERS OF FABRIC 18
PAN 20

INVENTOR
ALAN E. MURRAY
BY
Eyre, Mann & Lucas
ATTORNEYS

July 27, 1965    A. E. MURRAY    3,197,534
METHOD OF FORMING THIN RESILIENT SHELLS
Filed Aug. 22, 1961    3 Sheets-Sheet 3

INVENTOR
ALAN E. MURRAY
BY
Eyre, Mann & Lucas
ATTORNEYS 3,197,534
METHOD OF FORMING THIN RESILIENT SHELLS
Alan E. Murray, 616 Fairfield Ave., Bridgeport 3, Conn.
Filed Aug. 22, 1961, Ser. No. 133,096
14 Claims. (Cl. 264—223)

This application is a continuation-in-part of my earlier copending applications Serial No. 861,367, filed December 22, 1959 and Serial No. 28,074, filed May 10, 1960 (both now abandoned), and other matters disclosed in such earlier cases are also being claimed in my copending application Serial No. 133,220, filed August 22, 1961 entitled "Color Designs in Gypsum Sheets."

This invention relates to a method of forming thin lightweight molded shells of gypsum which are extremely strong and resilient and to the shell structures themselves.

I have now discovered that it is possible to mold thin layers of gypsum plaster into complex three-dimensional shapes in controlled manner to form lightweight molded shells which unexpectedly have tremendous strength and resiliency, far greater than would normally be expected for a rigid crystalline material such as gypsum. My remarkable results are to a large measure made possible by the use of layers of wet substantially open mesh fabric material which act as a control grid, making it possible to mold very thin layers of gypsum plaster into intricate shapes without any loss of detail, and the fabric material also plays an important part in reinforcing the thin layers of gypsum plaster and causing a uniform, substantially complete conversion of the gypsum plaster into gypsum. In order to be effective for these purposes, I have found that it is essential to wet the fabric material prior to the time it is used in the method of my invention. If the fabric material is not first wetted, it is completely ineffective for the purposes I have mentioned and the unexpected results of my invention will not be achieved.

Briefly described, my invention comprises the steps of placing at least one layer of open mesh fabric material upon a surface the contour of which is desired to be copied or reproduced, wetting the fabric material with water, and then applying an aqueous slurry of gypsum plaster to the fabric material in such manner as will cause the plaster particles to travel through the fabric material and contact the underlying surface that is being reproduced. The amount of gypsum plaster applied should be sufficient to penetrate and envelop each fiber of the fabric material with plaster particles but even so the thickness of the gypsum plaster is very small, usually about ⅛ inch and rarely exceeding ¼ inch. Within minutes after its application, the gypsum plaster hardens and sets, and every minute detail of the contour of the underlying surface is captured in a thin lightweight shell of hard crystallinge gypsum.

While the shell has unusually high strength and resiliency, I have found that its strength and resiliency can be further increased more than fourfold of the shell is impregnated with a film-forming plastic material. Thus, I prefer to thoroughly dry the shell and then impregnate it with a solution of such plastic material in a volatile organic solvent which can be evaporated or driven out of the shell at room or higher temperatures. After the solvent has evaporated, the crystalline gypsum lattice of the thin shell will be contained in a resilient plastic body which is better able to withstand bending stresses than the relatively rigid, brittle gypsum lattice and the plastic treatment thus protects the gypsum shell and increases its strength and resiliency. Furthermore, the plastic material seals the pores of the gypsum shell so that the shell can be washed or exposed to corrosive materials without the danger of damaging its structure or appearance.

As I have mentioned hereinabove, the wetting of the fabric material is a critically important step in my method. While I do not completely understand the reasons for this, I find that the gypsum plaster particles are in some way attracted by the water in the fibers of the fabric material. The plaster particles penetrate deeply into the fibers and even through them in traveling to the underlying surface that is being reproduced. This is shown by the fact that if a sharp, clean cut is made through the hardened shell to obtain a cross section, the fibers of the fabric material are virtually undistinguishable from the gypsum body of the shell. Apparently, the water provides a path into and around the fibers by which the plaster particles are able to fill and occupy the most remote interior voids and open spaces in and around the fibers. This intimate fusion of particles and fibers results in a final shell of integral uniformity which possesses great strength and resiliency. I have attempted to carry out my method without first wetting the layers of fabric material and the results have been completely unsatisfactory. The water path being absent, there is little penetration of the fibers. The surface of the finished shell usually contains voids and similar imperfections. Some of the fibers are visible and the shell has little, if any, strength. Apparently, when the gypsum plaster is applied to dry fabric material, the plaster particles are deposited only on the surface of the fibers rather than penetrating deeply into them. The intimate fusion of particles and fibers is completely lacking so that the great strength and resiliency of thin shells prepared in accordance with my invention cannot be achieved.

The wet fibers of fabric material I employ have a further important function of ensuring that substantially all of the gypsum plaster in the thin shell is completely converted to gypsum.

The term "gypsum plaster" refers to a well known group of hardenable molding materials which consist essentially of calcium sulfate and which are produced by the complete or partial dehydration of gypsum, the dihydrate of calcium sulfate. Calcium sulfate hemihydrate is the material most commonly sold as gypsum plaster or plaster of Paris and in setting into the hard gypsum this material takes up one and one-half moles of water of crystallization. Thus, a sufficient amount of water must be available to gypsum plaster in order for it to change completely to gypsum by the hydration reaction that is involved. In applying an aqueous slurry of gypsum plaster to layers of fabric material, once the slurry has been applied in the required quantity, only a fixed amount of water, that which is retained in the particular amount of slurry, is available to the gypsum plaster. I have found that when dry layers of fabric material are used, much of this amount of water is immediately absorbed by the dry fibers and taken away from the gypsum plaster particles which are deposited only upon the surface of the fibers to begin with. Thus, the gypsum plaster particles are prematurely robbed, so to speak, of the water necessary for complete hydration into gypsum with the result that a complete, uniform conversion is not achieved.

When the fabric material is first wetted in accordance with my invention, water is not absorbed out of the plaster slurry as the fibers are already saturated but instead the plaster particles penetrate deeply into the fibers.

Thus, the wet fibers act as a reservoir holding a reserve supply of water in the vicinity of every gypsum plaster particle and ensuring that substantially all of the gypsum plaster is hydrated into a continuous, uniform crystalline lattice of gypsum. This materially adds to the strength and resiliency of the thin gypsum shell.

A further advantage of wetting the fabric material prior to application of the gypsum plaster slurry is that the surface tension of the water acts as a temporary binder between the fibers and the contour of the underlying surface which is to be reproduced. As a result, the fibers can be readily conformed to the underlying surface without wrinkles or folds before the slurry is applied and it is a fact that in my method, not only the gypsum plaster particles but also the fabric material fibers themselves are molded into intimate replicas of the surface contour that is being reproduced. Thus, gypsum shells prepared in accordance with my invention reproduce topographical details with an amazing degree of accuracy and exactness.

As to materials, any commercially available form of gypsum plaster may be employed in my invention. Alpha gypsum, sold under the trade name Hydrocal, is a calcium sulfate hemihydrate in the form of finely divided, nonporus, dense particles and this is the material I prefer to use. In making up an aqueous slurry, I prefer to use as much water as possible, that is, the slurry should be as fluid and free flowing as can be mixed in order that it may be readily applied to the layers of fabric material. If desired, sodium chloride or other salts known to accelerate hardening of the gypsum plaster may be dissolved in the water used for the slurry, although this is not actually necessary. Only a small amount of the salt is required, usually not more than about 1% of the weight of water that is used. After the slurry has been applied to the fabric layers and hardened, the gypsum shell may be completely dried at ordinary atmospheric temperatures or in an oven at temperatures up to about 225° F.

As to the layers of fabric material, this may be any substantially open mesh fabric of commercially available textile materials. By the term open mesh I mean that there should be a visible space or opening between the weft and warp of the fabric when it is held up to a light so that the gypsum plaster slurry can pass through the material. The material I prefer to use is cheesecloth. However, other materials such as burlap, loosely woven cotton goods, and synthetic textiles made, for example, from nylon and polyesters may also be employed. In addition, porous paper sheets such as tissue paper may be substituted for the fabric materials. At least one layer of the fabric material must be employed. The number of layers may be increased as desired up to about ten layers. Higher numbers give no added advantage and generally are a waste of materials. As mentioned previously, the fabric material must be wetted before the gypsum plaster slurry is applied thereto. For this purpose ordinary water may be employed or if desired, aqueous salt solutions mentioned in connection with forming the plaster slurry, may be used. Generally speaking, I prefer to wet the fabric material in situ upon the underlying surface which is to be reproduced. This may be done with an ordinary paint brush or roller and the gypsum plaster slurry may be applied to the fabric material in the same manner.

As to the plastic materials for sealing the dried gypsum shells, these may be resilient film-forming organic plastics such as cellulose nitrate, cellulose acetate, cellulose propionate, cellulose butyrate, cellulose acetate butyrate, cellulose propionate butyrate, polymerized esters of acrylic and methacrylic acids, vinyl polymers, nylon and similar materials. Preferably, the plastic is dissolved in a solvent which is moderately volatile at ordinary room temperatures such as low molecular weight alcohols, ketones, esters and ethers, including acetone, ethyl acetate, methyl ethyl ketone and mixtures thereof. The dried, hardened gypsum shell is impregnated with the plastic solution either by dipping or by painting as with a brush. Surprisingly, although the plastic may be highly flammable, once incorporated in the gypsum shell, it is completely non-flammable even to the extent that it does not char when contacted with a flame. Thus the products of my invention do not create any problems as to fire hazards.

My invention has a wide variety of uses and applications. It is a perfect tool for copying three-dimensional surfaces in a permanent manner. In this connection I have found my method to be an excellent way of forming exact negative replicas of statues, sculptures, other art objects and solid shapes of any configuration. If the method is used upon an underlying surface to which the gypsum plaster adheres on setting, it is possible to form permanent, durable, hard covers in the form of the thin gypsum shell which protects the underlying surface. For example, when room interiors such as walls and ceilings in a new building have been rough finished with a mortar, the final finish coat of gypsum plaster can be readily formed by using my method in situ upon the surface of the mortar with any desired number of fabric material layers in any desired thickness. Also, my invention is not limited to three-dimensional surfaces. Thus, I can preform thin gypsum shells of any dimensions upon an absolutely flat underlying surface and the surface of the shell, in contact with the flat surface, will be correspondingly flat and perfectly uniform. The preformed shells can then be mounted in conventional manner upon walls or other flat surfaces as a protective covering similar to wall paper. The same method may be used to prepare flat gypsum shells in the form of small squares which can then be cemented upon floors in the manner of conventional floor tiles. In any or all of the foregoing methods aqueous dye solutions may be used to slurry the gypsum plaster particles in order to form gypsum shells of uniform, solid colors. Thus, it is apparent that my invention may be employed in connection with the formation of three-dimensional, two-dimensional and mixed three-dimensional and two-dimensional thin shells of gypsum and it will be understood that the term shell, as used in the specification and claims herein, is intended to refer to all of the possible configurations.

Among its wide number of uses, my invention has particular advantage as a means for preparing thin, lightweight shells of the foot which are adapted for use in the manufacture of molded shoes. Such shoes are custom fitted to the individual contours of the wearer's foot and thereby give far more support and comfort than ordinary stock shoes. Thus, in making the shoes it is necessary to first prepare a positive casting of the foot, which accurately reproduces the contours thereof, to which the shoe can be shaped and fitted. Since my method will capture the exact contours of any three-dimensional configuration, a thin shell of the foot made in accordance with my invention can be used to prepare a positive casting which reproduces the minutest details of the foot contours and makes possible the manufacture of molded shoes which fit the feet for which they are intended exactly.

Figure 8:
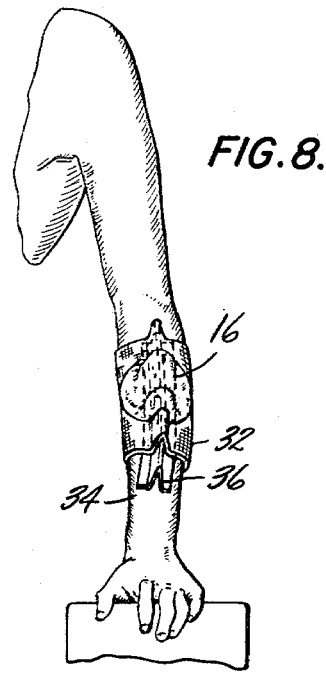
Figure 7:
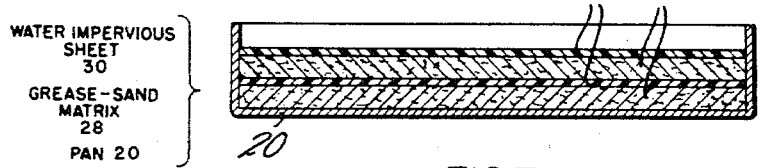
Figure 2:
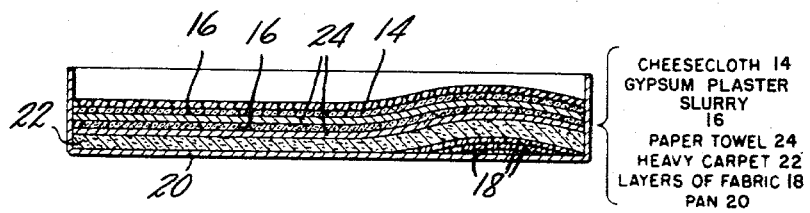
Figure 3:
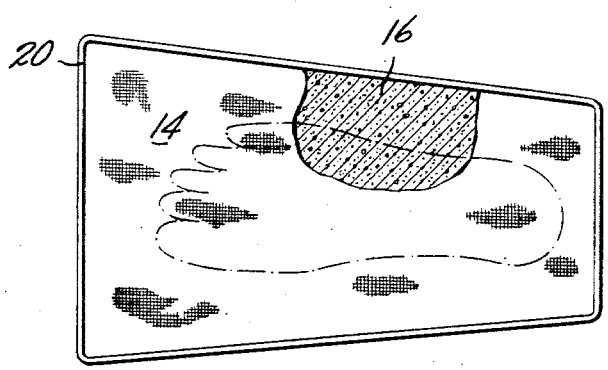
Figure 4:
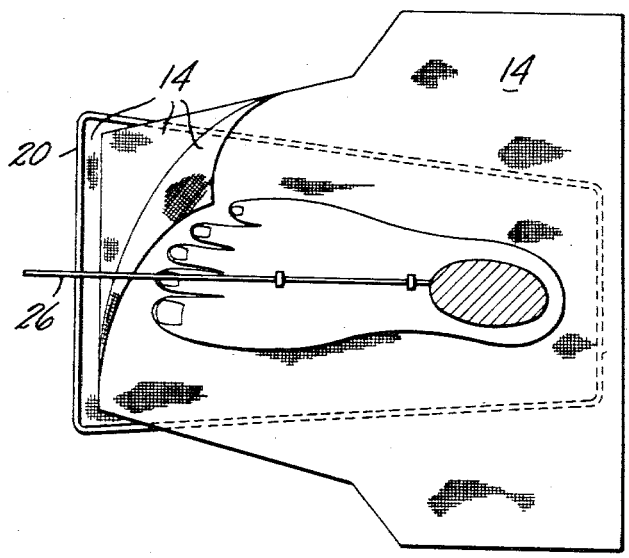
Figure 5:
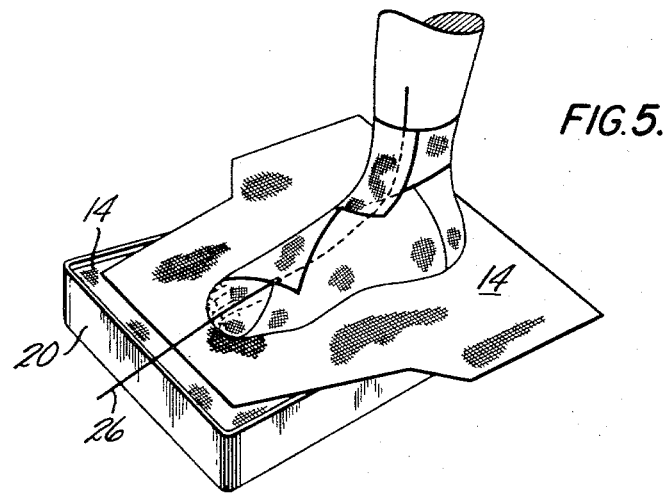
Figure 6:
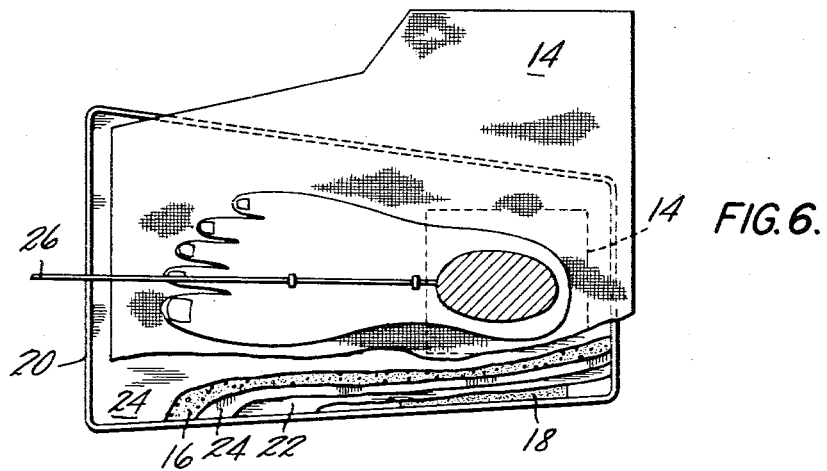

Further details of my invention will be readily understood by reference to the accompanying drawings in which:

FIG. 1 is a plan view partly broken away of an assembly by which a three-dimensional pattern is reproduced in a gypsum shell, FIG. 2 is a cross section of a pan showing materials placed therein prior to formation of a foot positioner in the form of a female die for the sole of the foot, FIG. 3 is a top plan view of the completed female die of the sole of a foot in the positioner of FIG. 5, FIGS. 4 and 5 illustrate stages in the process of forming a gypsum shell about the foot, FIG. 7 being a plan view and FIG. 8 being a perspective view, FIG. 6 illustrates an alternative process of making the shell shown in FIGS. 4 and 5, FIG. 7 is a side view in section of a second form of foot positioner, FIG. 8 illustrates the formation of a gypsum shell for support of a person's arm with the process of my invention.

Turning now to FIG. 1, a thin sheet of rubber 10 having the floral patterns 12 permanently molded therein in the form of shallow three-dimensional depressions, is there illustrated. In reproducing this pattern in a thin resilient gypsum shell, the rubber sheet 10 is placed on a table or other work support (not shown) with that surface of the pattern to be reproduced being exposed upwardly. Next, two layers of dry cheesecloth layers are placed over the rubber sheet 10 and then thoroughly wetted with water. This may be conveniently done with a paint brush or roller dipped in water which is applied in liberal quantities, sufficient to saturate every fiber of the cheesecloth. As the cheesecloth fibers are wetted, they adhere to the contour of the pattern surface and in this way become preliminarily conformed to the surface contour. Thereafter, a free flowing aqueous slurry of gypsum plaster is applied to the cheesecloth layers, preferably with a paint brush. The water on the pattern surface and in the cheesecloth fibers attracts the gypsum plaster particles which readily fill and occupy the voids in the fibers themselves, and at the same time assume the shape of the contours in the pattern surface with which they are in contact. Within minutes the gypsum plaster will set to the point where it is self supporting in the form of a thin resilient shell. Thereafter, the shell is thoroughly dried at which time the particles will be in the form of gypsum and, if desired, the shell can be impregnated with a resilient plastic material, as mentioned hereinabove, to increase its strength and resiliency. The final result is a thin gypsum shell which reproduces exactly the floral pattern of the rubber sheet 10 in the form of a mirror image.

In preparing thin resilient gypsum shells of the foot, preferably a rigid female die is first prepared which retains the shape of the sole of the foot in weight-bearing position. The die is then used to position and contain the foot while the thin resilient shell is formed about the entire foot as described hereinbelow.

As shown in FIG. 2 the assembly for the die is prepared by placing a few layers of fabric 18 in a suitable pan 20 at the location which will support the heel, the fabric layers serving to raise the level of the heel above that of the ball of the foot. Carpet material 22, having a deep resilient pile made up of individual twists of fibers and of such dimensions as will substantially cover the area of the pan base, is placed over the fabric layers and then a paper sheet 24, such as a paper towel, is placed on the carpet. A pool of gypsum plaster slurry 16 having the consistency of a soft paste is poured over the paper sheet 24, sodium chloride being preferably added to the slurry to decrease setting time. On top of the pool another paper 24 is placed which is then brushed with the gypsum plaster slurry 16. To complete the assembly, a layer of cheesecloth 14 previously soaked in an aqueous salt solution, is placed over the slurry.

The foot of an individual is then placed on the assembly with the heel of the foot above the location of the fabric layers 18. The individual should be seated on a chair, so that the weight of a substantial portion of the leg bears on the foot. The weight of the leg is sufficient to form an impression of the sole of the foot in the pool of gypsum plaster slurry. After the impression is formed and before the gypsum plaster has hardened, the top cheesecloth layer 14 is pulled up between the big toe and the adjacent small toe with any suitable hooked implement to build a pyramid therebetween, and while the assembly is hardening, the undercut along the edges of the foot is brushed down. After the gypsum plaster has hardened, the foot is removed and any sharp edges on the ridge along the undercut are smoothened with a pallet knife. The hardened die is then brushed with a layer of grease over which is placed a paper towel which is brushed down into the grease with a dry brush.

The rigid female die of the sole of the foot resulting from the above described procedure gives containment. The die takes on the true shape of the foot in weight-bearing position upon a hydraulic base. The die is used to accurately position and lock the foot in a contained position while a thin resilient shell is formed on the foot in accordance with the process of my invention.

In one preferred method a layer of gypsum plaster slurry is painted over the impression of the rigid female die and three layers of cheesecloth 14, wetted with water and preferably of T-shape are placed down into the slurry with the base of the T covering the die and the top of the T to the rear of the heel portion (see FIG. 4). The foot is placed on the cheesecloth layers and a wire 26 is taped along the top of the foot and up the front of the ankle and leg, the wire extending forwardly beyond the big toe. The top piece of cheesecloth, after slitting at the base of the T to accommodate the wire 26, is pulled up about the foot and ankle, and conformed to the foot by painting the cheesecloth with the aqueous gypsum plaster slurry. As shown in FIG. 5, this is accomplished by first drawing up one half of the base of the T over the top of the foot and toes, then bringing the center portion of the top of the T against the back of the heel and molding an arm of the T about the ankle. This half of the cheesecloth is painted against the foot with the gypsum plaster slurry, and then the second half of the base of the T is drawn up and placed over the top of the foot and toes and over the layer of cheesecloth thereon and the second arm of the T is wrapped about the ankle, over the layer of cheesecloth thereon. This second half of cheesecloth is also painted against the foot with gypsum plaster slurry. After the first layer has been conformed the second and third layers are immediately conformed with the same procedure.

The resulting shell sets rapidly, particularly if the shell is made while heat is still being generated by the setting of the gypsum plaster in the female die, although this is not necessary. Since the shell is thin and flexible it may be easily removed from the foot after it has set by pulling the wire 26 away from the foot and leg. After removal of the foot, the shell can be held together with rubber bands or with the hand while the open seam is brushed with slurry to join the shell together again. Thereafter, the shell can be impregnated with resilient plastic material as mentioned hereinabove.

In the foregoing processes of molding a single unitary negative shell around the foot, the shell is preferably separated from the female die by a layer of grease. But this is not necessary and if desired the foot may be removed from the shell and a positive may be poured up in the negative which in such case remains in position in the female die.

If the positive casting is to be poured up with the negative shell in place in the female die, the paper tissue and the grease above the hardened die assembly are eliminated and the shell of the foot is formed in the same manner as described heretofore directly upon the exposed hardened surface of the female die. While the shell is being formed, the wet gypsum plaster slurry beneath the sole of the foot contacts the hardened surface of the female die and the two surfaces join. After the upper shell has hardened, the foot is removed therefrom by means of wire 26 and the adhered female die is conveniently trimmed with shears, leaving a peripheral flange of about ½ inch projecting outwardly from the edges of the sole of the foot. This composite shell is then ready to be used to prepare a positive mold of the foot.

Although use of the female die which included the pool of gypsum cement slurry was described heretofore in connection with a two step process of forming a shell, this die may also be used to form a shell in a single step. This procedure is diagrammatically illustrated in FIG. 6 in which there is placed in the pan 20, the fabric pieces 18, the carpet 22, the paper sheet 24, as in the two step process described in connection with FIG. 2. Three layers of cheesecloth, soaked in aqueous salt solution are then painted upon the assembly with gypsum plaster slurry. If desired two smaller pieces of cheesecloth 14 may be included between the large cheesecloth layers to give added strength to the area that will fit around the heel. While the pool of slurry and the impregnated layers of cheesecloth thereover are still wet, the foot is placed on the assembly with the wire 26 taped as before upon the foot. Sand is placed between the toes to prevent formation of a flange in the hardened shell. The cheesecloth is then cut to accommodate the wire 26. One half of the top cheesecloth layer is then wraped over the top of the foot and around the angle and conformed thereto with gypsum plaster slurry as described heretofore. The second half of the top cheesecloth layer is then wrapped over the foot and the first half of cheesecloth and conformed thereto. The same procedure is followed with the second and third layers of cheesecloth. After the gypsum plaster has hardened the wire 26 is pulled through the cast so that the foot may be withdrawn.

All of the foregoing methods reproduce the true contour of the foot when at rest or in static position. In the act of taking a step, different portions of the sole of the foot are brought into and out of contact with the ground as the foot is flexed. The area of the ground covered by the foot in stepping is different from that covered in the rest or static position and it is highly desirable to reproduce the former for manufacture of molded shoes.

I have found that this can be achieved by flexing the foot in a plastic positioner which has a density gradient through its depth. The foot is rocked back and forth in a plastic positioner and because of the rocking motion and because of the variable density of the support I so control the contour of the impression of the foot that it simulates the ground area covered by the foot as in normal walking attitude. This in turn permits manufacture of molded shoes which give maximum control and comfort for the individual during walking.

My variable density positioner contains two layers of a shape-retaining non-crumbling particulate plastic matrix the upper layer of which is less dense than the lower layer. As the foot is pressed into the matrix the upper less dense layer readily deforms and gives way to accommodate the soft fleshy portions of the foot. Thereafter, as the foot travels down into more dense material, the reverse pressure on the foot increases to positively control the shape of the foot within the limits of the initial undistorted impression. For this reason the upper portion of the plastic matrix must always be less dense than the lower portion.

During the rocking motion the upper less dense portion of the matrix tends to be pushed away from the sides of the foot causing the sides of the impression to become oversize. This is compensated for by pressing the upper portion of the matrix back toward the sides of the foot during rocking so that after the impression has been fully developed the sides of the foot are in intimate contact with the matrix material. There is no problem at the undercut line since the foot is pressed down deep enough into the matrix to eliminate the undercut line along the sides thereof.

My variable density foot positioner is illustrated in FIG. 7. A plastic matrix 28 comprising a mixture of grease and a particulate material such as sand, is placed in the pan 20. This matrix is covered with a sheet 30 of thin flexible water-impervious material such as plastic film. Then I place another layer of the grease-sand matrix 28 over the sheet 30, this layer having less density than the layer underneath. The top layer of matrix is also covered by a sheet 30 of the water-impervious material. While the positioner shown in FIG. 7 does not contain pads to raise the level of the heel it will be understood that foam rubber pads, terrycloth layers, sand and other materials may be used in the pan for this purpose as described heretofore.

The density of the plastic matrix can be controlled by the volume ratio of sand particles for a given volume of grease for both layers. For example, the bottom layer can be prepared by mixing 3½ volumes of sand for each volume of grease and the upper layer in this case will contain 1½ volumes of sand of the same particle size for each volume of grease. Another satisfactory variable density matrix consists of two layers of grease-sand in the proportion of two volumes of sand per volume of grease, the upper layer sand particles having an average diameter of about 1000 microns and the lower layer sand particles having an average diameter of about 400 microns. Within the range of 1 to 4 volumes of sand for each volume of the same grease I prefer to use sand particles having average diameters of about 100 microns to 1500 microns for the two layer density gradient matrix. The exact difference between the densities of the upper and lower layers is not critical as long as the upper density is less. In general a small difference in density will give more positive control than a large difference and depending upon the extent of the control necessary for a particular foot the densities of the two layers can be selected from the limits of sand to grease volume ratios given heretofore. If sand of a given particle size and the same grease is used for the upper and lower layers, the amount of sand in the upper layer should not be more than 85% the amount of sand in the lower layer. On the other hand if the same sand to grease volume ratio is used for both the upper and lower layers, the average particle size of the sand in the upper layer should be at least 30% greater than the average particle size of the sand in the lower layer. If putty is used as the plastic matrix the density can be varied by adding small amounts of oil such as mineral oil, castor oil and soybean oil to the putty.

After the variable density positioner is prepared, I have a seated individual place his foot thereon and press his foot down into the positioner to form a static impression of the foot therein. In order to form the dynamic stepping impression I rock the foot gently back and forth from heel to toe. The longer this is done the more there is a tendency for the size of the impression to become larger than the size of the foot. This is compensated for by pressing the soft upper grease-sand matrix in toward the edge of the foot during the rocking. This process is continued until the foot impression extends through the upper grease-sand and into the lower matrix. The depth of the impression controls the fleshy portions of the sides of the foot to the dynamic stepping contour. After the impression is formed the positioner is covered with layers of cheesecloth painted with gypsum plaster slurry and used to control the contour of the foot as the cheesecloth layers are molded into a thin shell conforming to such contour. The shell may be prepared by any of the methods described hereinabove where the foot is supported with some form of positioner. After the shell has set and dried it can be treated with the resilient plastic material in order to seal its pores and increase its strength and resiliency.

FIG. 8 illustrates the way in which my process can be used to form strong lightweight gypsum shells conforming to various parts of the body. These are of great advantage for purposes of supporting broken limbs since the shells are so light, yet strong, and this materially adds to the comfort of the patient. The shell is only about ⅛ to ¼ inch thick and yet has remarkable strength and resiliency. Thicker casts may also be made but the greater thickness is not actually necessary and only wastes materials.

In preparing the shell, two layers of fabric material 32, preferably cheesecloth, are saturated with water. These are fitted about a limb having a separator thereon such as the arm 34 and separator 36 shown in FIG. 8. The separator is a narrow rectangular piece of paper, adhesive tape or metallic foil which is folded in half along its length. The fold is pressed together at the crease and the lower portions of the fold on each side are pressed against the arm 34 to provide a fin which projects out away from the arm. The wet cheesecloth layers are smoothly fitted to the surfaces of the separator and the arm, and in this connection the water again acts as a binder between the cheesecloth fibers and the skin so that the fabric is intimately conformed to the contours of the arm. Thereafter, aqueous gypsum plaster slurry is applied to the cheesecloth as with a brush whereby the plaster particles penetrate and fill the voids in and around the fibers. Simultaneously, the gypsum plaster is intimately molded into conformity with the contours of the arm. After the gypsum plaster particles have crystallized and hardened, the resulting shell, being thin and resilient, can be readily removed from the arm by cutting off the crease along the top of the fin and flexing apart the sides of the shell along the folds of the separator. The shell is then treated with a solution of resilient plastic material as previously described and replaced about the arm.

It is obvious that the above described process for making shells is subject to variations. For example, if desired two separators, placed on opposite sides of the arm, may be used instead of only one as shown in FIG. 8. In this case the shell can be opened and separated into two pieces for removal from the arm. If a shell of large volume is to be prepared such as one enveloping the trunk of the body, then three or more separators can be used to form a shell in three or more sections. This is of great advantage where the physician wishes to examine a small area of the trunk since the particularly section of the shell covering the area can be readily removed without having to open or disturb the remainder of the shell.

It will be understood that it is intended to cover all changes and modifications of the preferred embodiment of the invention herein chosen for the purpose of illustration which do not constitute departures from the spirit and scope of the invention.

I claim:

1. The method of forming a thin resilient shell to reproduce the contour of a surface which comprises the steps of placing at least one layer of substantially open mesh fabric material upon a surface, wetting the fabric material with water, applying an aqueous slurry of gypsum plaster to the fabric material while said fabric material is still wet, and permitting the gypsum plaster to harden while in contact with said surface to form a thin shell.

2. The method in accordance with claim 1 which includes the step of drying the thin shell at temperatures up to about 225° F.

3. The method in accordance with claim 1 which includes the step of impregnating the thin shell with a resilient plastic material.

4. The method of forming a thin resilient shell to reproduce the contour of a surface which comprises the steps of placing at least one layer of substantially open mesh fabric material upon a surface, wetting the fabric material and the surface with water, applying an aqueous slurry of gypsum plaster to the fabric material while said fabric material is still wet, applying pressure upon the slurry to cause it to move through the fabric material and contact the surface thereunder, and permitting the gypsum plaster to harden while in contact with said surface to form a thin shell.

5. The method in accordance with claim 4 which includes the step of impregnating and coating the thin shell with a resilient film-forming plastic material.

6. The method in accordance with claim 4 in which the contour of the surface is three dimensional.

7. The method in accordance with claim 4 in which the contour of the surface is three dimensional in part and two dimensional in part.

8. The method of forming a thin resilient shell around a foot to reproduce the contour thereof which comprises the steps of placing at least one layer of substantially open mesh fabric material around the foot, wetting the fabric material and the foot with water, applying an aqueous slurry of gypsum plaster to the fabric material while said fabric material is still wet, applying pressure upon the slurry to cause it to move through the fabric material and contact the foot, and permitting the gypsum plaster to harden in situ while in contact with the foot to form a thin shell.

9. The method in accordance with claim 8 which includes the step of coating the foot with a thin layer of the aqueous gypsum plaster slurry prior to placing the fabric material therearound.

10. The method in accordance with claim 8 which includes the step of impregnating and coating the thin shell with a resilient film-forming plastic material.

11. The method of forming a thin resilient shell around a foot to reproduce the contour thereof which comprises the steps of placing in a pan and superimposing one over the other at least one layer of carpet material having a resilient pile, a thin flexible water-impervious film, a pool of an aqueous slurry of gypsum plaster and a layer of substantially open mesh fabric material to form a foot positioner, placing a foot into the positioner to form an impression therein, permitting the gypsum plaster to set into a hard mass, removing the foot, coating the surface of the positioner and the impression therein with a water-impervious lubricant, wetting a plurality of layers of substantially open mesh fabric material with water, placing the wet fabric material over the positioner, applying an aqueous slurry of gypsum plaster to that portion of the fabric material which covers the impression, pressing the foot into the impression, wrapping the uppermost layer of fabric material around the foot and while said fabric material is still wet, applying aqueous gypsum plaster slurry thereto under pressure to cause the slurry to move through the fabric material and contact the foot, repeating the last mentioned step with the remaining layers of fabric material, permitting the gypsum plaster to harden while in contact with the foot to form a thin shell.

12. The method in accordance with claim 11 which includes the steps of affixing a thin wire to the foot extending along the ridge line of the top of the foot up beyond the ankle and out beyond the big toe, slitting the layers of fabric material in front of the big toe to accommodate the wire before wrapping the uppermost layer of fabric material around the foot, and the further step of pulling the wire away from the foot to cut through the thin shell after it has been formed.

13. The method in accordance with claim 11 which includes the step of impregnating and coating the thin shell with a resilient film-forming plastic material.

14. The method in accordance with claim 11 in which the plurality of layers of fabric material are placed directly over the surface of the positioner without a water-impervious lubricant therebetween whereby the thin shell is permanently fused to the positioner after it is formed.

References Cited by the Examiner

UNITED STATES PATENTS

| | | | |
|---|---|---|---|
| 631,205 | 8/99 | Edgar | 18—58 |
| 1,474,817 | 11/23 | Fincke | 18—60 |
| 1,545,369 | 7/25 | Tizley | 264—129 XR |
| 1,641,404 | 9/27 | Washington | 18—61 |
| 1,647,639 | 11/27 | Larson | 264—223 XR |
| 1,675,202 | 6/28 | Warne | 264—257 |
| 1,941,985 | 1/34 | Holcomb | 154—45.9 |
| 2,324,325 | 7/43 | Schuh | 154—45.9 |
| 2,891,285 | 6/59 | Kaplan | 264—223 |
| 2,913,771 | 11/59 | Murray | 264—223 |

ALEXANDER H. BRODMERKEL, *Primary Examiner.*

MICHAEL V. BRINDISI, ROBERT F. WHITE,
*Examiners.*